United States Patent [19]
Hershberger

[11] Patent Number: 5,398,091
[45] Date of Patent: Mar. 14, 1995

[54] METHOD AND APPARATUS FOR OPTIMIZING FILM FLATNESS IN A CAMERA EXPOSURE GATE

[75] Inventor: Marc Hershberger, Rochester, N.Y.
[73] Assignee: Eastman Kodak Company, Rochester, N.Y.
[21] Appl. No.: 851,728
[22] Filed: Mar. 17, 1992
[51] Int. Cl.[6] ............................................. G03B 17/00
[52] U.S. Cl. ..................................................... 354/203
[58] Field of Search ..................... 354/203, 206, 195.1, 354/215

[56] References Cited

U.S. PATENT DOCUMENTS

| | | | |
|---|---|---|---|
| 2,903,953 | 9/1959 | Meixner | 95/31 |
| 3,386,359 | 6/1968 | Gentile | 95/11 |
| 3,563,144 | 2/1971 | Fukino | 95/11 |
| 3,738,241 | 6/1973 | Bahnsen | 95/24 |
| 3,820,143 | 6/1974 | Keiner | 354/206 |
| 4,096,502 | 6/1978 | Danko, Jr. et al. | 354/203 |
| 4,152,062 | 5/1979 | Kobori | 354/203 |
| 4,168,116 | 9/1979 | Goldberg | 354/152 |
| 4,241,987 | 12/1980 | Goldberg | 354/195 |
| 4,933,693 | 6/1990 | Beach | 354/203 |
| 5,075,704 | 12/1991 | Yamamoto et al. | 354/105 |

*Primary Examiner*—Michael L. Gellner
*Assistant Examiner*—Nicholas J. Tuccillo
*Attorney, Agent, or Firm*—Roger A. Fields

[57] ABSTRACT

A method and apparatus suitable for use in a camera for alleviating the effects of film curl due to film core set in a film cartridge caused by aging and/or elevated temperatures. Curl in a film strip stored in a cartridge must be flattened out in the exposure space gate of the camera so that the camera is able to optimally focus an image of an object on the entire image receiving surface of the film within the exposure space gate of the camera. Photographic film wound tightly into film cartridges and stored for a period of time develops a core set approaching the diameter at which it was maintained such that film frames closest to the core have higher degrees of curl than those frames farther away from the cartridge core. Ambient temperature and humidity also contribute to the degree of curl at the time an exposure is made. In order to achieve optimum film flatness in a conventional space gate (i.e., platen, rails), a wider gap is optimum for higher curl and a narrow gap is optimum for lower curl. Adjustment of the gap in the space gate may be accomplished by mechanically detecting the diameter of the film wound about the take-up reel or may be electronically approximated by processing signals reflecting the manufactured date of the film cartridge, the total number of potential image frames of the film in the cartridge, and current exposure frame number to estimate the amount of core set and adjust the space gap accordingly in an automatic exposure control camera. Optionally, the ambient temperature and/or humidity may also be sensed and used to derive the space gate gap. Moreover, the focus of the camera lens may be adjusted along with the space gate gap.

22 Claims, 4 Drawing Sheets

METHOD AND APPARATUS FOR OPTIMIZING FILM FLATNESS IN A CAMERA EXPOSURE GATE

TECHNICAL FIELD OF THE INVENTION

The present invention relates generally to photographic cameras, and, more particularly, to cameras having an adjustable exposure frame space gate gap to achieve optimum flatness during exposure of an image frame.

DESCRIPTION OF THE PRIOR ART

In typical 35 mm cameras, the film strip is withdrawn from the 35 mm cartridge and advanced past a rectangular exposure window or space gate and wound up on a take-up reel until all potential image frames of the film are exposed. Thereafter, the film strip is automatically or mechanically rewound into the film cannister and the cannister is removed for processing.

Before the film is exposed, it may reside tightly wound in the cartridge or partially unwound within the camera for a period of time and under varying conditions of temperature and humidity such that the film takes a "core set" affecting the degree to which the film curls when unrestrained. When the film is originally manufactured and wound onto the core of the film cartridge, the innermost layers of the film strip wound around the core take on a higher degree of curl than the outermost layers, and the degree of Curl becomes more pronounced with the passage of time and exposure to elevated temperature and humidity.

This core set of the film may make it difficult in inexpensive camera constructions to accurately flatten the film in the exposure space gate so that the image exposed on the image frame in the space gate is undistorted. The flatness of the image receiving surface within the exposure space gate affects the degree to which the image exposed by the lens system on the image frame is in focus over the image frame.

Conventional 35 mm and rollfilm cameras employ a leaf spring-loaded flat or curved (depending on the lens system) pressure plate or "platen" which bears against the back surface of the film opposite to the image receiving surface to press the periphery of the image bearing surface of the film frame against frame rails and abutments defining the periphery of the space gate or exposure window in an attempt to flatten the film therein. The gap between the pressure plate and rails is selected in most instances in conformity with the thickness of the film such that, upon film advance, the film can slide through the space gate past the opposed platen and rails with as little friction as possible. It has been found that the degree of core set and resulting curl in the film affects the ability of the pressure plate to adequately flatten the film, particularly as the film curl increases in the innermost portion of the filmstrip wound about the core of the cartridge.

It has also been recognized that in certain circumstances it is desirable to adjust the position of the film image receiving surface as a function of the camera focus setting and aperture setting adjustment mechanisms at the extremes of adjustment in order to maintain the image frame in focus as taught, for example, in U.S. Pat. Nos. 4,168,116 and 4,241,987.

In the construction of molded reinforced plastic bodied cameras, it has been recognized in U.S. Pat. No. 4,152,062 that molding shrinkage affects the position of camera elements, and it is desirable to calibrate the space gate gap at the time of manufacture to compensate for such manufacturing variables.

It has been found that for film flatness in a conventional space gate defined by the platen and rails, a wider gap is optimum for higher curl and a narrower gap is optimum for a lower curl of the film. As long as the diameter of the layers of film wound about the core in the film cartridge is relatively large, the problem is minimized. As the diameter is decreased, however, there is a greater differential between the first frame curl and the last frame curl of any individual film strip subjected to core set as described above.

SUMMARY OF THE INVENTION

In accordance with the present invention, a space gate gap defined by the distance between a pressure plate adapted to bear against the nonexposed surface of a film strip and a pair of rails adapted to bear against the periphery of the image surface of the film strip is adjusted to compensate for the actual or estimated degree of core set curl in the film strip. The core set curl of the film strip is dependent upon the length of time that it has been wound about the core of the film cartridge, the diameter of the cartridge core and underlying layers of the film strip within the cartridge, the temperature to which the film has been exposed over time, and the relative humidity which affects the thickness of the film strip. It is therefore an object of the present invention to detect the core set induced film curl directly or indirectly and adjust the space gate gap to optimize the flatness of the image surface of the film in the space gate to diminish distortions in the exposed image frames.

It is accordingly an object of the present invention to provide a camera with a mechanism for detecting the degree of core set induced curl and for providing a method for optimizing the space gate gap.

The objects may be accomplished by a method and apparatus for sensing the theoretical or actual curl of the film in the camera and for positioning the platen relative to the rails or the rails relative to the platen to define the optimum space gap for the amount of actual or theoretical film curl. The objects of the present invention may be realized in numerous mechanical and electromechanical embodiments for measuring the actual or theoretical degree of curl of each frame of a given film strip and adjusting the space gate gap accordingly.

In a first category of preferred embodiments, in a camera where the filmstrip is withdrawn from the film cartridge and advanced through the space gate to expose each image frame and the exposed frames are wound onto a take-up spool, a film follower mechanism contacts the film as it is wound on the take-up spool of the camera. The film follower mechanism may be pivotally or linearly, movably mounted and its motion transferred to the platen or a platen interface mechanism such that as the film strip is wound up on the take-up reel, its increasing outer diameter which is dependent on the film thickness, the length of the film strip, and the degree of core set induced curl is detected to widen the space gate gap. By appropriate mechanical interconnection, the focus of the camera lens can be automatically adjusted for a given platen/rail space gap adjustment to compensate for relative displacement of the film image surface.

In a further electro-mechanical embodiment, it is contemplated that the space gate gap may be adjusted automatically to compensate for the estimated degree of core set induced curl of the film strip which may be derived by sensors capable of measuring current humidity and temperature as well as the manufactured date of the film cartridge, the original number of frames (and consequent length) of the film strip in the cartridge and the current exposure frame number. A microprocessor based system may be employed to derive and automatically adjust the appropriate space gate gap and optimize the focus of the lens system.

BRIEF DESCRIPTION OF THE DRAWINGS

Other objects, advantages and features of the present invention will become apparent from the following specification when taken in conjunction with the accompanying drawings in which like elements are commonly enumerated and in which.

DETAILED DESCRIPTION OF THE PREFERRED EMBODIMENTS

Figure 1:
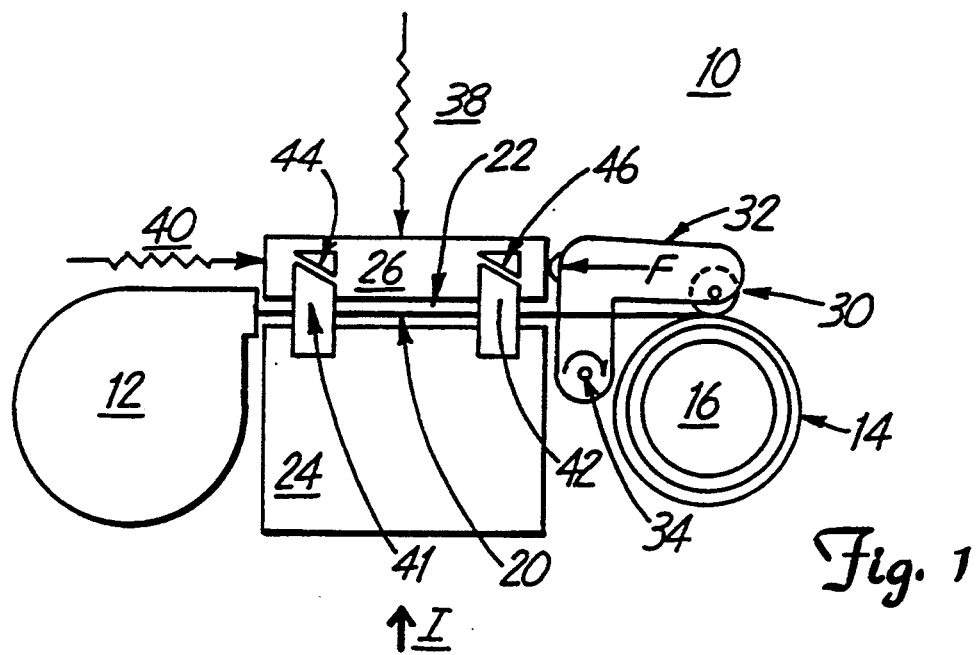
FIG. 1 is a top schematic view of a first embodiment of a camera utilizing the method and apparatus optimizing the space gate gap as a function of the core set film curl in accordance with the present invention.

Referring now to FIGS. 1-4, they schematically depict top views of embodiments of the present invention in the context of a camera generally indicated as 10. For purposes of these illustrations, the exterior housing and body of the camera, the camera lens, shutter and film advance mechanism are not illustrated since the precise construction of such parts is not critical to the present invention. Generally, standard compact, single lens reflex or other camera structure can be employed in the practice of the present invention and the illustrated embodiments take into account preexisting general structure in certain instances.

Thus, it will be understood that in each of the illustrated embodiments, a roll film cartridge 12 containing a film strip 14 is mounted in a camera 10 and advanced onto a take-up reel 16 by film advance mechanism (not shown) in the conventional fashion. Preferably, the film cartridge 12 is a conventional 35 mm film cartridge containing a length of 35 mm film of a length sufficient to expose the typical 12, 24 or 36 image frames.

In each of the schematic illustrations of FIGS. 1-4, it will also be understood that the camera 10 includes a lens and shutter mechanism mounted on the front of the camera housing and arranged so as to focus an image of a desired object in the direction of the arrow I generally in the direction of the image receiving surface 20 of the film 14. The film 14 is positioned within the space gate gap 22 defined by the distance between the platen 24 and the rails defining the edges of the image frame known in the prior art and falling generally within the boundaries of the box 24 projected upon the image receiving surface 20 of film 14.

For purposes of the illustration of the preferred embodiments of the present invention, it is assumed that the image receiving surface 20 is exactly perpendicular to the optical axis of the lens assembly which may be focused manually or automatically to project an image in the direction of arrow I onto the flat image receiving surface 20 within the image frame 24. As is known in the art, the lens assembly also includes an aperture selecting mechanism which may be manually or automatically adjusted to the desired f-stop. In the schematically illustrated camera, it will be presumed that the aperture will be automatically selected by the camera so as to provide a proper exposure on the film in conjunction with the exposure time setting, which is either preselected by the photographer or automatically selected by the camera. It will be appreciated that the present invention can be implemented in simple manual cameras or in complex electronically controlled auto-exposure and auto-focus cameras with motorized film advance available on the market at the present time. Thus, the remaining structural details of the cameras in which the present invention may be implemented are omitted from the figures.

For purposes of the present invention, it is only necessary that the camera 10 possess an adjustable pressure plate or platen 26 which bears to a greater or lesser degree against all or portions of the nonexposed reverse surface of the film 14 to flatten the side edges of the image receiving surface of the film 14 against the rails (not shown) in the conventional fashion. Typically, the platen 26 is mounted to the back wall of the camera body by means of a resilient leaf spring to resiliently bear against the back surface of the film 14 after it is loaded into the camera 10 and advanced from the film cartridge 12 onto the take-up reel 16. Usually, the pressure plate 26 is mounted by the spring to the door at the back of the camera which is opened to insert or remove the film cartridge 12 and bears against the film surface 21 upon closure and latching of the door. The distance between the camera rails and the surface of the platen 26 is referred to as the space gate gap 22.

Typically, the space gate gap in prior art cameras is a constant gap and does not vary in use of the camera. As described above, variation in the space gate gap to accommodate differing film thicknesses and to achieve the optimum positioning of the film image frame in relation to the extremes of focus of the lens system have been suggested. However, the prior art has generally overlooked the core set of the film 14 within the film cartridge 12 that arises innately with the winding of flexible film tightly into a small diameter within the film cartridge and is exacerbated by aging of the film and its exposure to elevated temperatures and humidity.

The film 14 when initially manufactured is rolled tightly onto a spool within the film cartridge 12 such that the innermost and outermost sections of the film 14 take a core set that is manifested by a tendency of the film to curl back on itself, when withdrawn from the cartridge, to a greater degree as the innermost winding layers are withdrawn, particularly with long film strips, aging and exposure to elevated temperatures. Normally, the spring loading of the platen 26 is selected to optimally flatten relatively fresh and uncurled film or is selected as a compromise between the expected extremes of film curling to flatten the film and present a flat image receiving surface within the film frame. Such a fixed spring tension is incapable of dealing with the variations in film curling force encountered in actual use.

Thus, in the illustrated embodiments of the present invention, various techniques are presented for adjusting the space gate gap 22 to optimize the flattening of the film in the image frame to overcome variations in the core set film curl encountered in practice. It has been found that to achieve optimum film flatness in a conventional space gate (i.e., platen, rails), a wider gap is optimum for higher curl and a narrow gap is optimum for lower curl. Consequently, the space gate gap 22 is varied as a function of the number of exposed image frames wound on the take-up spool 16 in the embodiments of FIGS. 1–4 and other factors are taken into account in the embodiment of FIG. 5.

Referring again to FIG. 1, the space gate gap 22 is varied as a function of the amount of film wound on take-up roll 16 by the action of a pivoted lever and ramp mechanism located outside the space gate so as to not interfere with the exposure of the image. A film follower roller 30 bears against the film 14 wound on the take-up reel 16, and as the diameter of the wound up film increases, the film follower roller 30 causes the L-shaped lever 32 to pivot on its pivot pin 34 and apply force in the direction of arrow F against the side of platen 26. The platen 26 is spring-loaded in the direction of arrows 38 and 40 to flatten the back surface 21 of the film 14 and to resist the pressure exerted in the direction of arrow F by the lever 32. However, the force exerted in the direction of arrow F overcomes the resistive force exerted in the direction of arrows 38 and 40 to move the platen 26 to the left against the ramps 41, 42. The ramps 42 are mounted on the camera frame and matching ramps 44, 46 on the topside of platen 26 bear against and move up the ramps 42 with increasing pressure applied in the direction of arrow F. Thus, the space gate gap 22 is increased as the film follower roller 30 causes the lever 32 to pivot as the diameter of the film 14 on take-up reel 16 increases. In this fashion, as the more tightly curled innermost windings of film are drawn into the space gate to be exposed as image frames, the space gate gap 22 is widened slightly to effect optimum flattening of the film surface 20. It will be understood that the ramp mechanism for adjusting the space gate gap may be duplicated at the bottom of the space gate to insure perpendicular orientation of the image frame to the arrow I.

Figure 2:
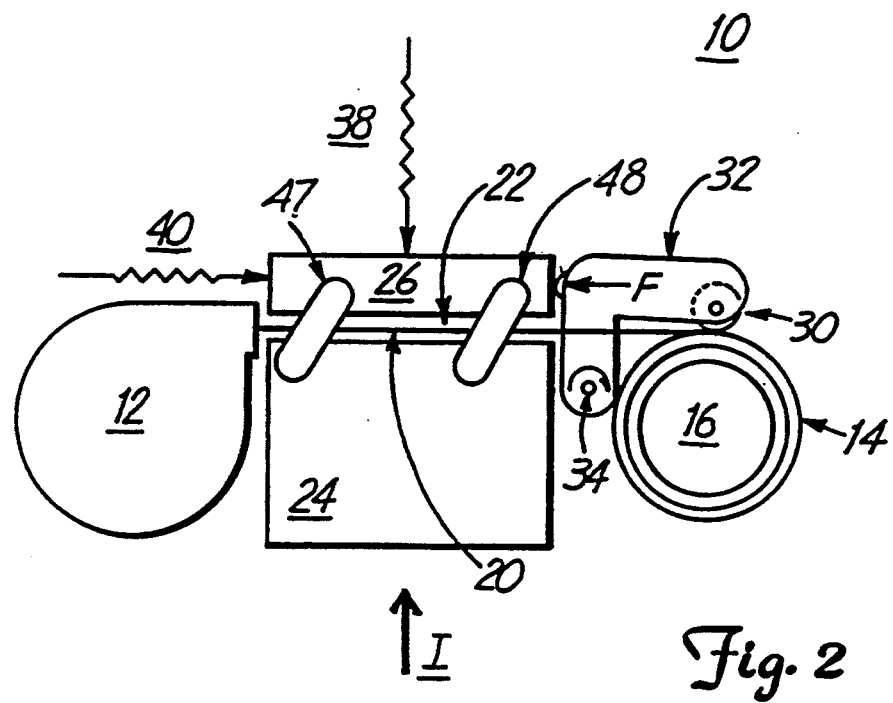
FIG. 2 is a top schematic view of a first variation of the first embodiment of FIG. 1.

Referring now to FIG. 2, it schematically illustrates a variation on the first embodiment of FIG. 1 wherein the mating ramps 41, 44 and 42, 46 are replaced by pivot arms 47 and 48. In this variation, the platen 26 is forced to move leftward against a spring force exerted in the direction of arrows 38 and 40 in response to the increase in the diameter of the film 14 rolled up in the reel 16.

Figure 3:
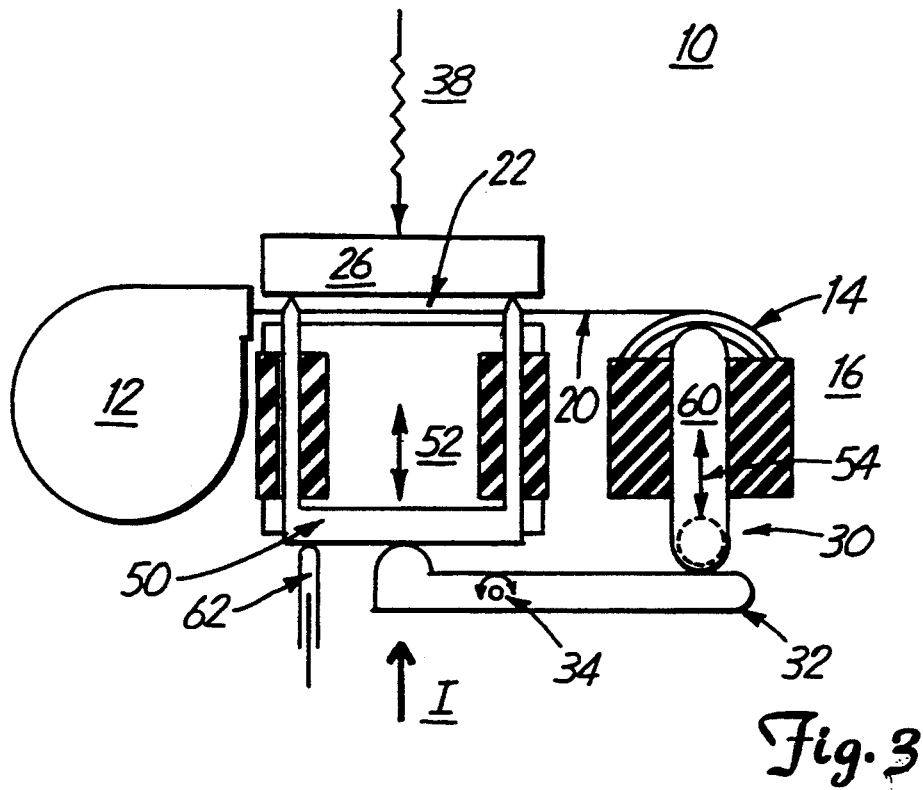
FIG. 3 is a top schematic view of a second embodiment of a camera utilizing therein the method and apparatus for optimizing the space gate gap with automatic focus adjustment constructed in accordance with the present invention.
Figure 4:
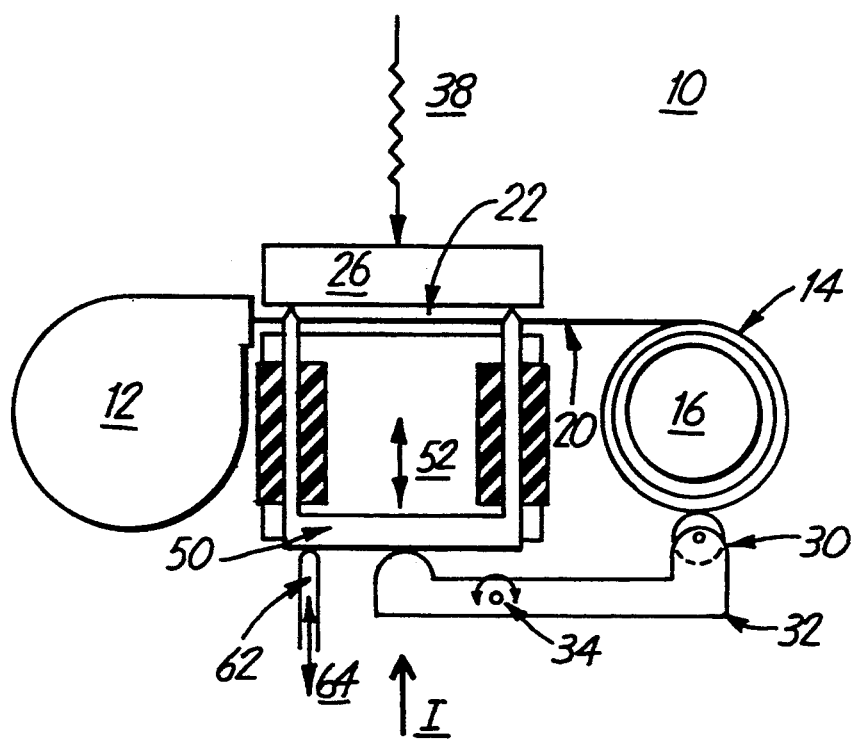
FIG. 4 is a top schematic view of a further variation on the embodiment of FIG. 3.

Referring now to FIGS. 3 and 4, they illustrate a second embodiment and a variation on that embodiment, respectively, for adjusting the space gate gap 22 without causing the platen 26 to move either right or left laterally. In certain cameras, such movement would be disallowed, since the platen 26 may have other camera interface functions. FIGS. 3 and 4 also illustrate the automatic adjustment of the focusing mechanism as a function of the adjustment of the space gate gap 22, although it will be understood that such automatic focus adjustment could be implemented in the embodiment and variation of FIGS. 1 and 2.

In FIGS. 3 and 4, the platen 26 is urged toward the back surface of the film 14 by a spring force urged in the direction of arrow 38 only. A space gate gap 22 is maintained by the contact with the U-shaped spacer bar 50 which bears against the surface of platen 26 above the rails or otherwise outside the space gate defined image frame of film 14. The U-shaped spacer bar 50 may be duplicated below the image frame to achieve a fully parallel space gate gap 22.

In the embodiment and variation illustrated in FIG. 3 and 4, the U-shaped bar 50 is moved back and forth in the direction of arrow 52 to vary the space gate gap 22 as a function of the amount of film 14 on take-up reel 16 by action of a film follower roller 30 on a pivoting lever arm 32. In the embodiment of FIG. 3, the film follower roller 30 is mounted on an arm 54 which is linearly movable in the direction of arrows 60. As the diameter of the film 14 on the take-up reel 16 increases, the lever 32 tends to apply force against the U-shaped bar 50 to increase the space gate gap 22 by pushing the platen 26 back against the force exerted in the direction of arrow 38.

In the variation on the second embodiment schematically illustrated in FIG. 4, the film follower roller 30 is mounted on the pivoting lever 32 and it follows the increasing diameter of the film 14 wound on the take-up reel 16 to increase the space gap 22 in the same fashion as in FIG. 3.

In the embodiment and variation illustrated in FIGS. 3 and 4, the adjustment of the space gate gap 22 is communicated to the focusing mechanism mechanically by way of an arm 62. As the U-shaped bar 50 moves in the direction of arrow 52, the arm 62 likewise moves in the direction of arrow 64 and communicates with an appropriate focusing mechanism to slightly alter the focus to take into account the slight variation in the positioning of the image receiving surface of the film in the image frame to ensure accurate focusing of the image on the surface 20 of film 14. Any appropriate interface mechanism will suffice to optimize the adjustment to the focus mechanism as a function of the change in the space gate gap, including electro-mechanical sensors.

In the embodiments described above in reference to FIGS. 1–4, tendency of the film to exhibit a greater curl as its innermost film layers are withdrawn from the film cartridge 12 is relied upon to effect the mechanical adjustment of the space gate gap 22. In automated cameras that are equipped with sophisticated electronic systems for autofocus and auto-exposure, the capacity exists to provide a system and method of operation in accordance with the invention illustrated in FIGS. 5 and 6 for estimating the degree of core set induced film curl and for adjusting the space gate gap and focus to compensate therefore. In such cameras equipped with custom microprocessor based electronic systems, it is possible to read the date of manufacturing and the number of frames on the cartridge (if either are recorded on the cartridge) and the current frame number from the frame counter. That data is employed, in accordance with the present invention, to estimate the degree of core set induced film curl and a control signal is derived from the estimated core set induced film curl and the current temperature and humidity and is applied to electromechanical devices to adjust the space gate gap and focus accordingly.

Figure 5:
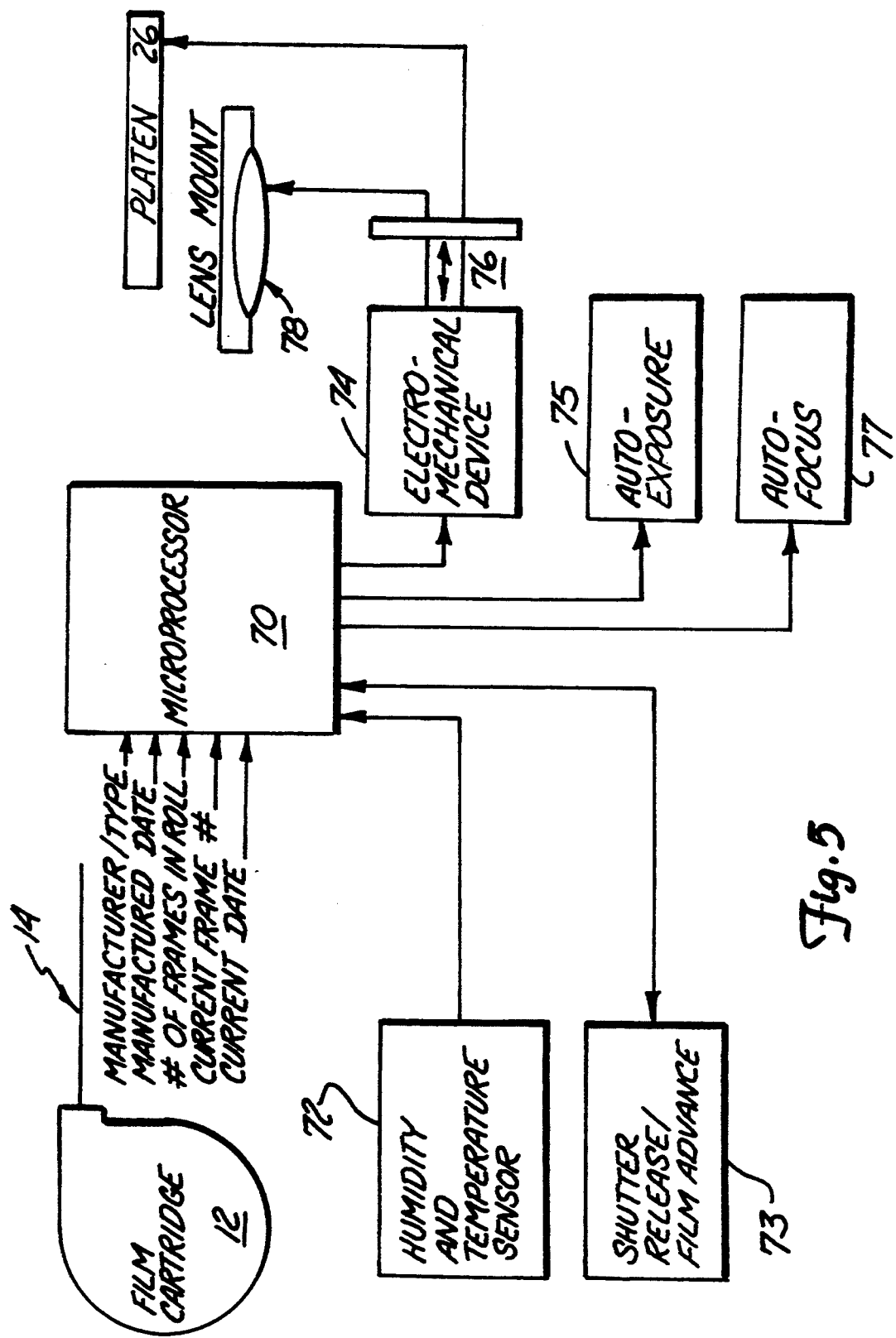
FIG. 5 is a schematic illustration of a microprocessor based system for estimating the degree of core set curl and adjusting the space gap and focus of a camera accordingly.

FIG. 5 schematically illustrates the components of such a system where the camera is provided with a microprocessor 70 which is coupled to sensors for reading the Manufacturer, Film Type, Manufacture Date, the Number of Frames in the Roll and the Current Frame Number from the film cartridge 12 and the frame counter in a shutter release/film advance mechanism 73. In addition, the microprocessor 70 is preferably coupled with humidity and/or temperature sensors 72 for reading out the current humidity and/or temperature and factoring those values in during the calculation of the space gate gap. Such calculation is preferably conducted upon the initial depression of the exposure button of the camera during the automatic focusing and setting of exposure control which take place in a fashion well known in the prior art.

Film age may be derived by comparing the read-out Date of Manufacture to the current date. The microprocessor 70 may have an associated real-time clock for the current date and the calculation of the film age.

The microprocessor 70 is preferably programmed in accordance with the invention to employ the read-in values to calculate the space gate gap and an adjustment factor for the automatic focus. The microprocessor 70 generates appropriate control signals that are applied to electromechanical device 74 which, in response, effects movement in the direction of arrow 76 of the lens mount 78 and the platen 26. In addition, if the camera is provided with an adjustable lens aperture and shutter speed controlled by the microprocessor, the f-stop selection range available to the automatic exposure control block 75 may be automatically restricted to the smaller apertures to enhance depth of field at the imaging receiving surface of a film frame with abnormally high curl.

Figure 6:
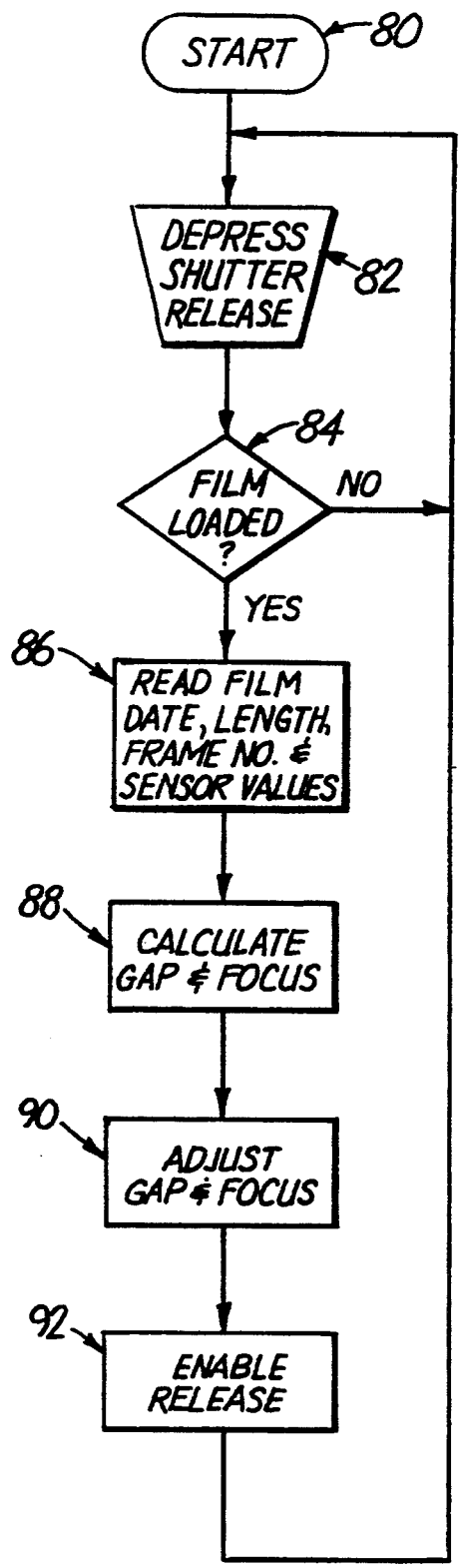
FIG. 6 is a simplified flow chart of the method of operating the system of FIG. 5.

Referring now to FIG. 6, it illustrates one simplified flow chart of an algorithm that may be employed in the system depicted in FIG. 5. At the start or in standby mode, functions of the microprocessor 70 are minimized to decrease current drawn from the camera's battery. However, when the shutter release is depressed, the microprocessor 70 is enabled to commence the exposure control and auto-focus functions and to provide alphanumeric displays to the user in a fashion well known in the art (not shown in FIG. 6). In accordance with FIG. 6, at the same time that the shutter release is initially depressed in block 82 by the user, the microprocessor reads the presence of a film cartridge 12 in block 84, and, if film is present, then reads the film type, manufacturer, manufacture date, length, frame number and the sensor values in block 86. In block 88, a space gate gap and the focus adjustment factor, if any, are calculated and adjusted in block 90. Shutter release is enabled in block 92 in conjunction with the completion of the autofocus and auto-exposure routines.

The derivation of the adjusted space gap in block 88 from the nominal space gap involves the addition or subtraction of summed adjustment factors for each variable. Generally, film curl increases with total film length (i.e., number of potential film frames), film aging, and film frames that are closer to the core of the film cartridge. Film curl may decrease with higher ambient temperature as the film becomes more limp, but higher ambient humidity and temperature together may increase the film thickness as it absorbs water vapor, which would call for increasing the space gate gap.

In the simplest approach, the adjustment factor may be directly proportional to the current exposure frame number, which would be somewhat analogous to the mechanical feedback systems of FIGS. 1-4.

It will be understood by those familiar with the art that the innermost layers of film which exhibit core set induced film curl may be either the high frame number or low frame number portions of the film strip depending on whether the camera film advance mechanism withdraws the film from or winds the film back into the film cartridge for each exposure, respectively.

Further adjustment factors tending to increase or decrease the space gate gap would be derived in accordance with a further aspect of the invention, by comparing the sensor values to look-up table adjustment factor values and summing all of the positive and negative factors to arrive at the adjusted space gap. The stored adjustment factor values may reflect a linear or non-linear relation between the detected variable value and film curl of the exposure frame of the film in the space gate.

The simplified flow chart of FIG. 6 is merely illustrative of one of many possible algorithms through which the concepts of the present invention may be implemented. It also illustrates the initial routine after initial film loading, and it will be understood that the film type, date of manufacture and its length may alternatively, in accordance with the invention, be retained in memory after the first frame is exposed, and the memorized values may be erased upon rewinding or removal of the film cartridge. In order to shorten the electromechanical device 74 operating time, in accordance with a further aspect of the invention, the calculated and adjusted space gate gap and focus values may be retained in memory between exposure frames and adjusted as necessary at each exposure.

The algorithm illustrated in the flow chart of FIG. 6 and its above-described variations may, in addition, be triggered by events other than the depression of the shutter release. For example, cameras having automatic film loading and film ASA reading and frame number setting may read the film type, manufacturer, date of manufacture and number of frames and store that data on loading. Detection of the frame number and the calculation and adjustment of the space gate gap and focus correction may in accordance with a still further aspect of the invention, be conducted at the end of each exposure cycle, e.g., during the mechanical or automatic film advance cycle. Then the final adjustment could be conducted by reading the ambient temperature and/or humidity in the initial phase of the shutter release, if the camera is so configured with such a sensor or sensors.

In addition, in accordance with a further aspect of the invention, the automatic, electro-mechanical embodiment of FIGS. 5 and 6 may also receive a mechanical sensor input signal from the take-up film reel film diameter in the manner of the FIG. 1-4 embodiments in substitution for the frame counter or in addition to it. A mechanical sensor would advantageously take into account the differing film thicknesses of various film types and manufacturers as well as film thickness variations due to the storage conditions of the film in or outside the camera preceding its use.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

What is claimed is:

1. In a camera of the type having a lens assembly, a shutter mechanism and a film advance mechanism for advancing film past an exposure space gate and between a film cartridge and take-up reel, wherein the exposure space gate includes a pressure plate for exerting pressure against the back of the film to press it flat against the exposure space gate rails to thereby define an exposure frame, the improvement in apparatus for adjusting the exposure space gate gap between the pressure plate and space gate rails to compensate for core set film curl comprising:
   means for detecting the amount of the exposed film wound about the take-up reel; and
   means for adjusting the space gate gap between the pressure plate and the rails by an amount proportional to the detected amount to compensate for film curl.

2. The camera of claim 1 wherein said detecting means comprises film follower means adapted to bear against the film wound about said take-up reel and mechanically coupled to said adjusting means for adjusting the position of the pressure plate and the consequent pressure exerted against the film in the exposure space gate as a function of the diameter of the film wound on said take-up reel.

3. The camera of claim 2 further comprising:
   means for adjusting the lens assembly in response to the detected diameter to compensate for any change in focus due to the adjustment of the space gate gap.

4. The camera of claim 1 further comprising:
   means for adjusting the lens assembly in response to the detected amount to compensate for any change in focus due to the adjustment of the space gate gap.

5. In a camera of the type having a lens assembly, a shutter mechanism and a film advance mechanism for advancing film past an exposure space gate and between a film cartridge and take-up reel, wherein the exposure space gate includes a pressure plate for exerting pressure against the back of the film to stretch it flat against the exposure space gate rails to thereby define an exposure frame, the improved method for adjusting the exposure space gate gap between the pressure plate and space gate rails to compensate for core set film curl comprising the steps of:
   detecting the amount of the film wound about the take-up reel; and
   adjusting the space gate gap between the pressure plate and the rails by an amount proportional to the detected amount to compensate for film curl.

6. The method of claim 5 wherein said detecting steps comprises providing film follower means adapted to bear against the film wound about said take-up reel and mechanically coupled to said adjusting means for adjusting the position of the pressure plate and the consequent pressure exerted against the film in the film exposure space gate as a function of the diameter of film wound on said take-up reel.

7. The method of claim 6 further comprising the step of:
   adjusting the lens assembly in response to the detected diameter to compensate for any change in focus due to the adjustment of the space gate gap.

8. The method of claim 5 further comprising the step of:
   adjusting the lens assembly in response to the detected amount to compensate for any change in focus due to the adjustment of the space gate gap.

9. In a camera of the type having a lens assembly, a shutter mechanism and a film advance mechanism for advancing film past an exposure space gate and between a film cartridge and take-up reel, wherein the exposure space gate includes a pressure plate for exerting pressure against the back of the film to press it flat against the exposure space gate rails to thereby define an exposure frame, the improvement in apparatus for adjusting the exposure space gate gap between the pressure plate and space gate rails to compensate for core set film curl comprising:
   means for reading film data from the film cartridge;
   means for detecting a current value representative of the length of the film wound about the take-up reel; and
   means for adjusting the space gate gap between the pressure plate and the rails in relation to the detected length value and the film data to approximately compensate for estimated film curl.

10. The camera of claim 9 further comprising:
    means for sensing an ambient environmental condition when an exposure is to be made; and
    means for adjusting the space gate gap as a function of the sensed ambient condition.

11. The camera of claim 10 wherein said ambient condition includes the current temperature.

12. The camera of claim 11 wherein said ambient condition includes the current humidity.

13. The camera of claim 10 wherein said ambient condition includes the current humidity.

14. The camera of claim 10 further comprising:
    means for adjusting the lens assembly with the adjustment of the space gate gap to optimize focus to the space gate gap adjustment.

15. The camera of claim 9 further comprising:
    means for adjusting the lens assembly with the adjustment of the space gate gap to optimize focus to the space gate gap adjustment.

16. In a camera of the type having a lens assembly, a shutter mechanism and a film advance mechanism for advancing film past an exposure space gate and between a film cartridge and take-up reel, wherein the exposure space gate includes a pressure plate for exerting pressure against the back of the film to press it flat against the exposure space gate rails to thereby define an exposure frame, an improved method for adjusting the exposure space gate gap between the pressure plate and space gate rails to compensate for core set film curl comprising the steps of:
    reading film data from the film cartridge;
    detecting a current value representative of the length of the film wound about the take-up reel; and
    adjusting the space gate gap between the pressure plate and the rails in relation to the detected length value and the film data to approximately compensate for estimated film curl.

17. The method of claim 16 further comprising the steps of:
    sensing an ambient environmental condition when an exposure is to be made; and
    adjusting the space gate gap as a function of the sensed condition.

18. The method of claim 17 wherein said ambient condition includes the current temperature.

19. The method of claim 18 wherein said ambient condition includes the current humidity.

20. The method of claim 17 wherein said ambient condition includes the current humidity.

21. The method of claim 17 further comprising the steps of:

adjusting the lens assembly with the adjustment of the space gate gap to optimize focus to the space gate gap adjustment.

22. The method of claim 16 further comprising the step of:

adjusting the lens assembly with the adjustment of the space gate gap to optimize focus to the space gate gap adjustment.

* * * * *